Dec. 3, 1968  R. J. SMITH  3,414,452
LABELER
Original Filed June 3, 1964  11 Sheets-Sheet 1

INVENTOR.
RUSLON J. SMITH
BY
Charles J. Johnson Jr.
ATTORNEY

Dec. 3, 1968 R. J. SMITH 3,414,452
LABELER
Original Filed June 3, 1964 11 Sheets-Sheet 2

INVENTOR.
RUSLON J. SMITH
BY
ATTORNEY

Dec. 3, 1968   R. J. SMITH   3,414,452
LABELER
Original Filed June 3, 1964   11 Sheets-Sheet 3

INVENTOR.
RUSLON J. SMITH
BY
ATTORNEY

Dec. 3, 1968 R. J. SMITH 3,414,452
LABELER
Original Filed June 3, 1964 11 Sheets-Sheet 4
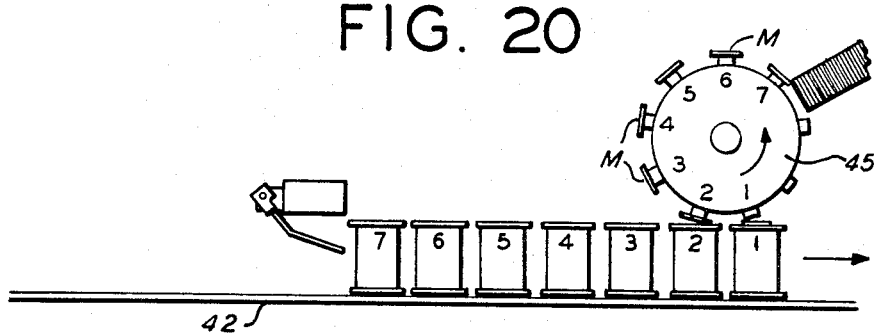
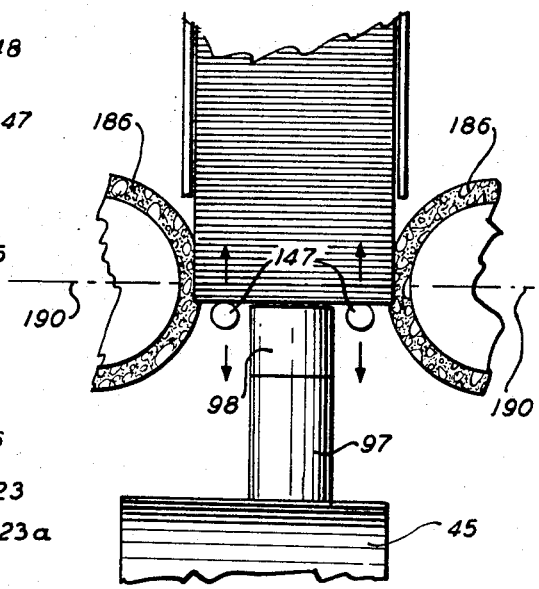
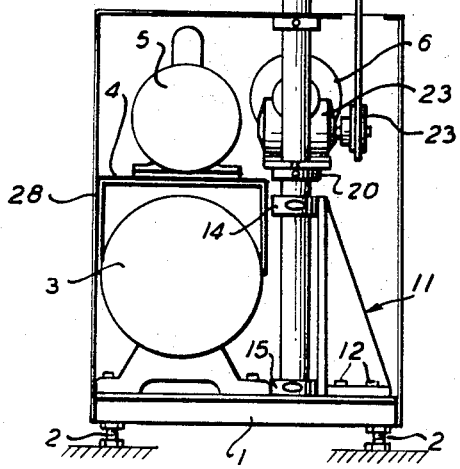
INVENTOR.
RUSLON J. SMITH
BY
ATTORNEY

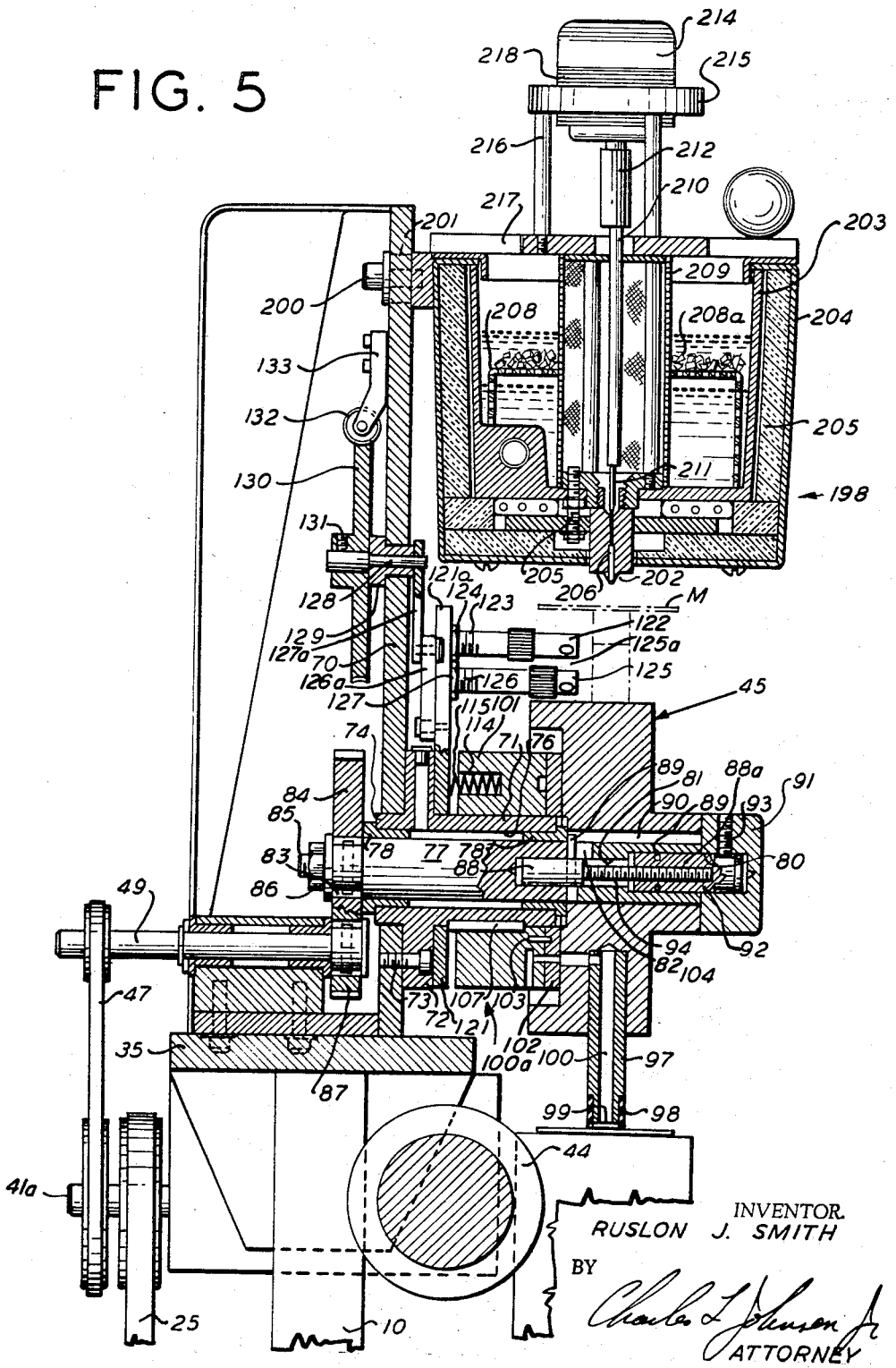

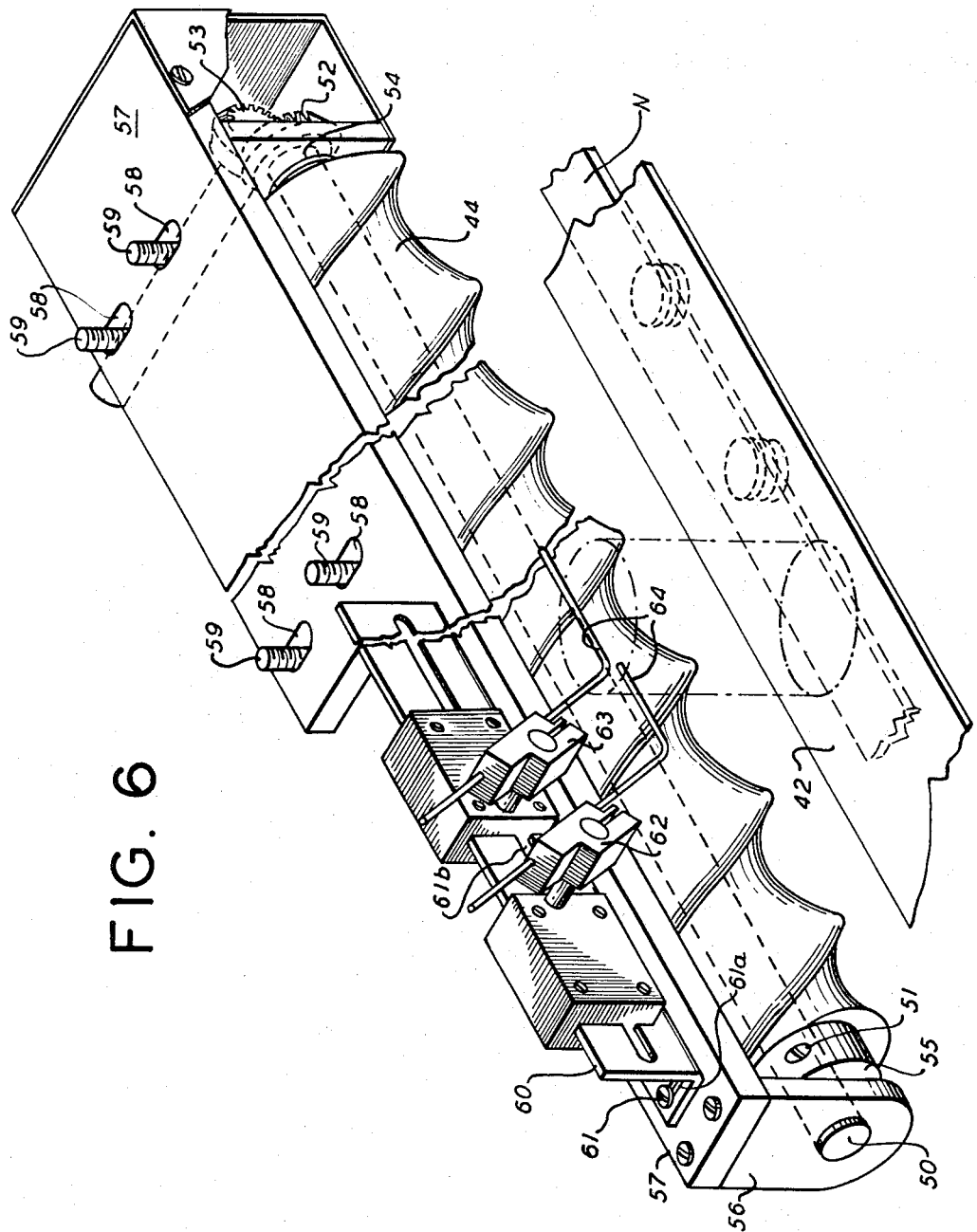

Dec. 3, 1968  R. J. SMITH  3,414,452
LABELER
Original Filed June 3, 1964  11 Sheets-Sheet 7
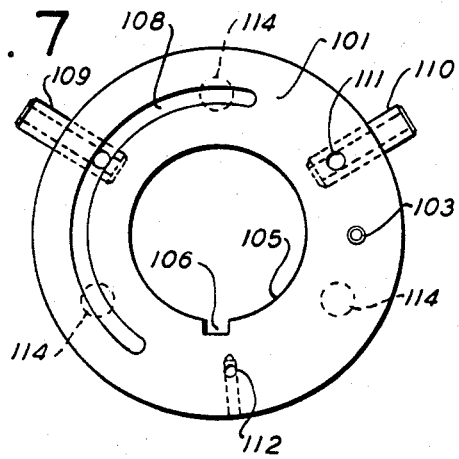
FIG. 7
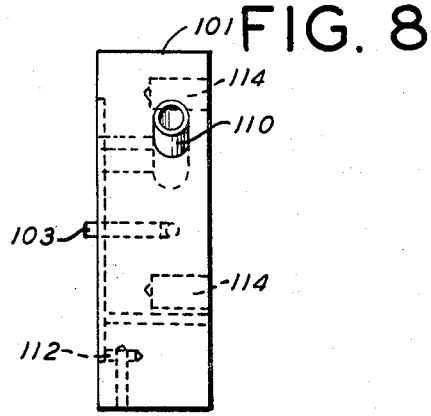
FIG. 8
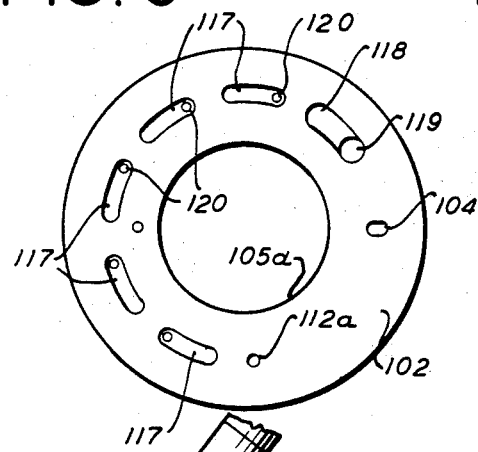
FIG. 9
FIG. 10
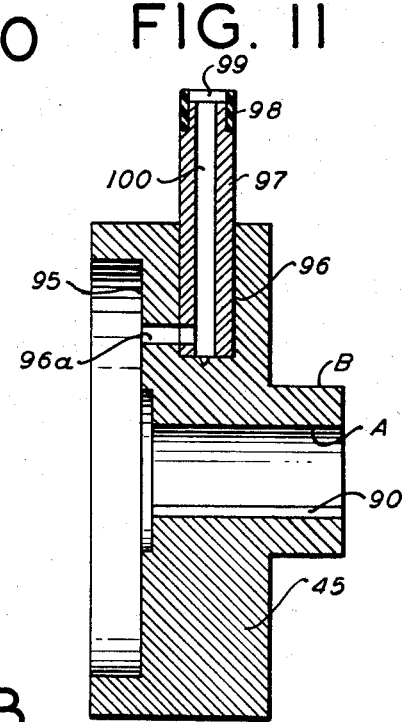
FIG. 11
FIG. 12
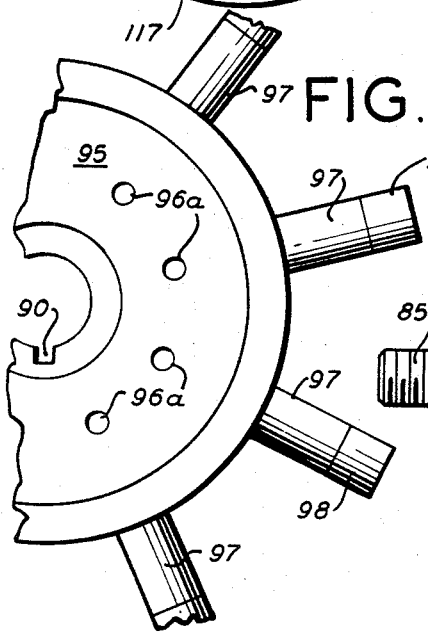
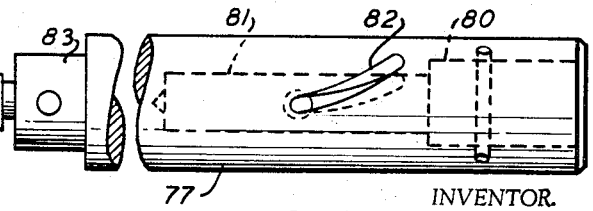
FIG. 13
INVENTOR.
RUSLON J. SMITH
BY
Charles T. Johnson Jr.
ATTORNEY

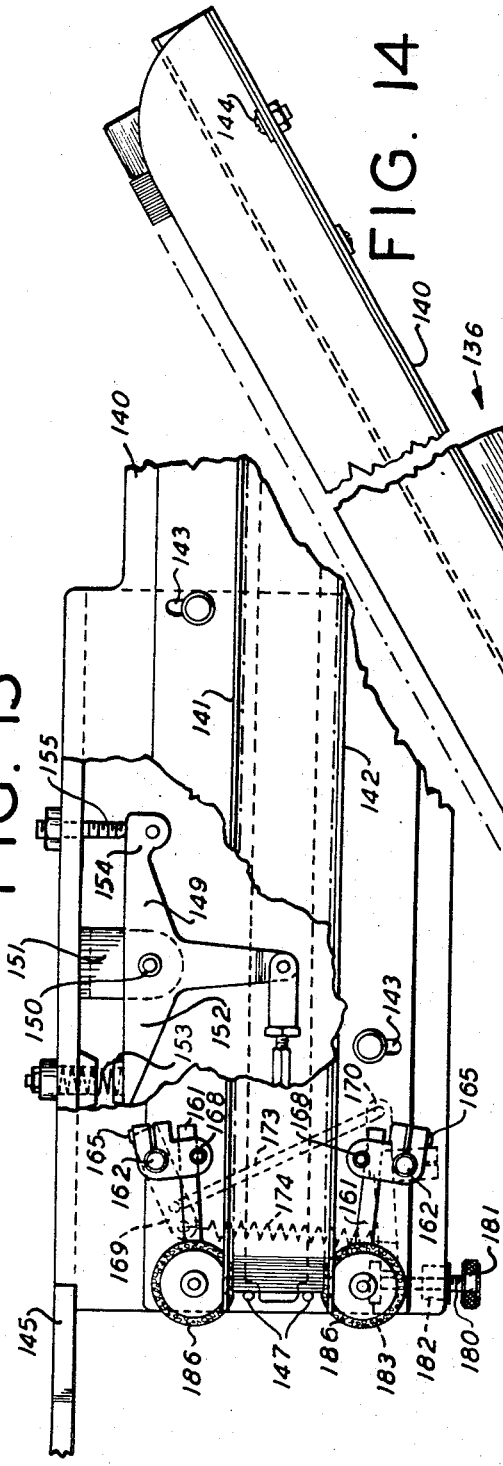
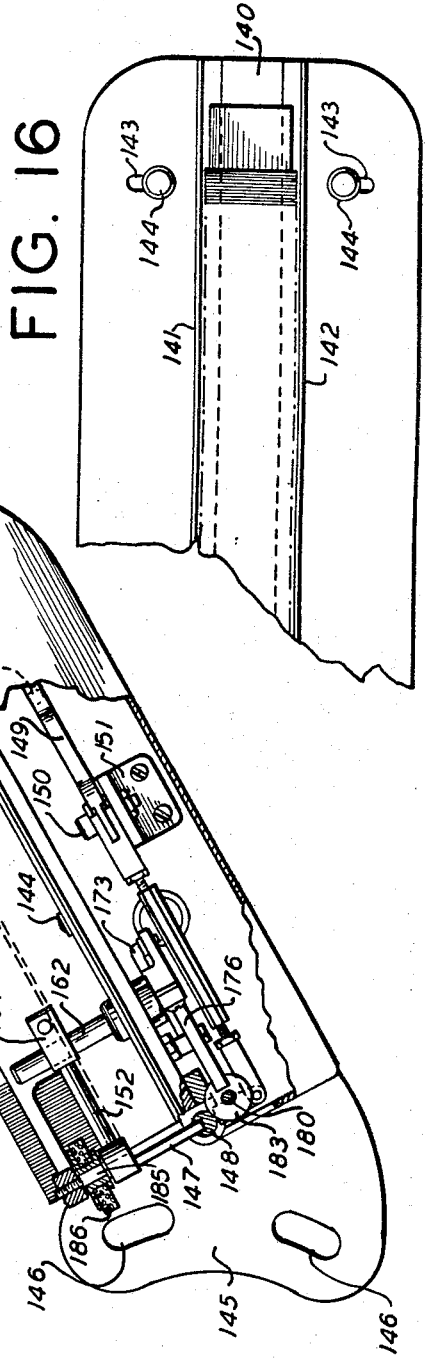

Dec. 3, 1968   R. J. SMITH   3,414,452
LABELER
Original Filed June 3, 1964   11 Sheets-Sheet 9
FIG. 17
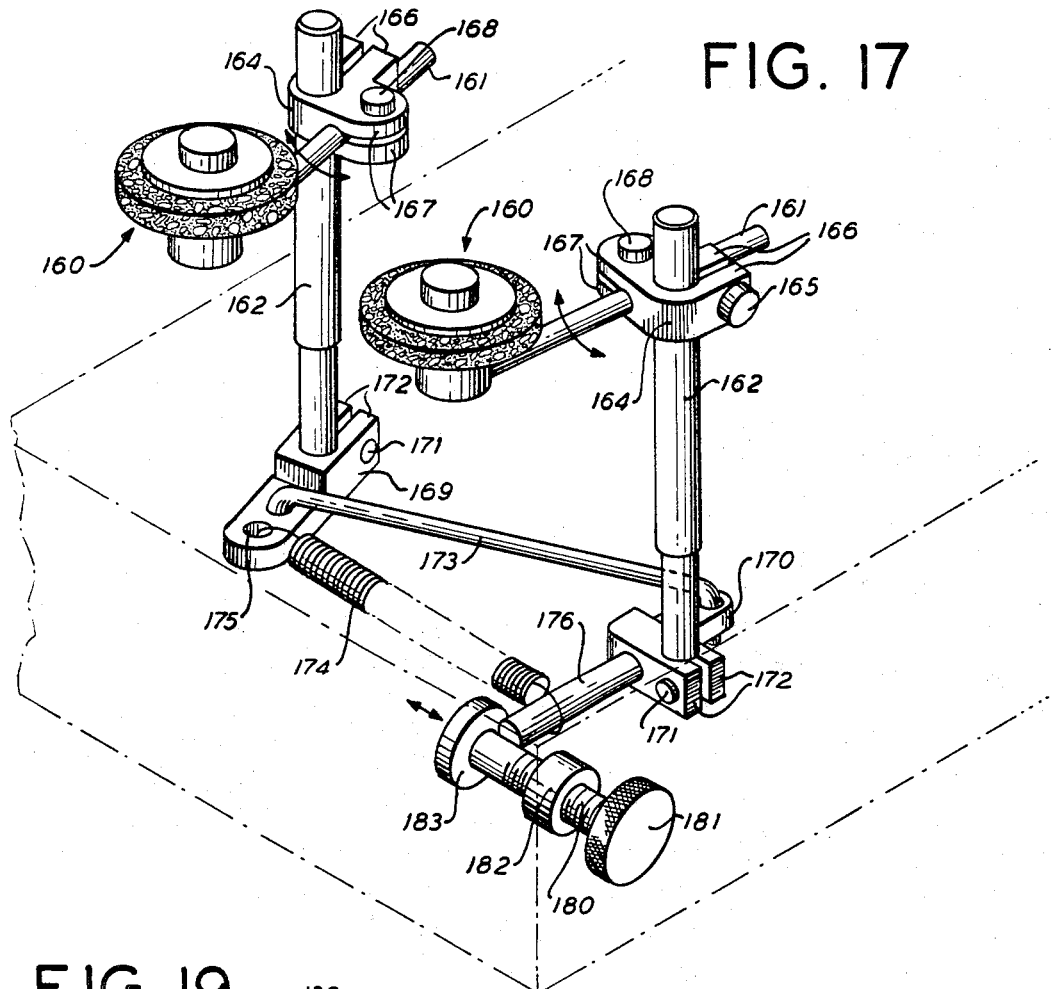
FIG. 19
FIG. 18
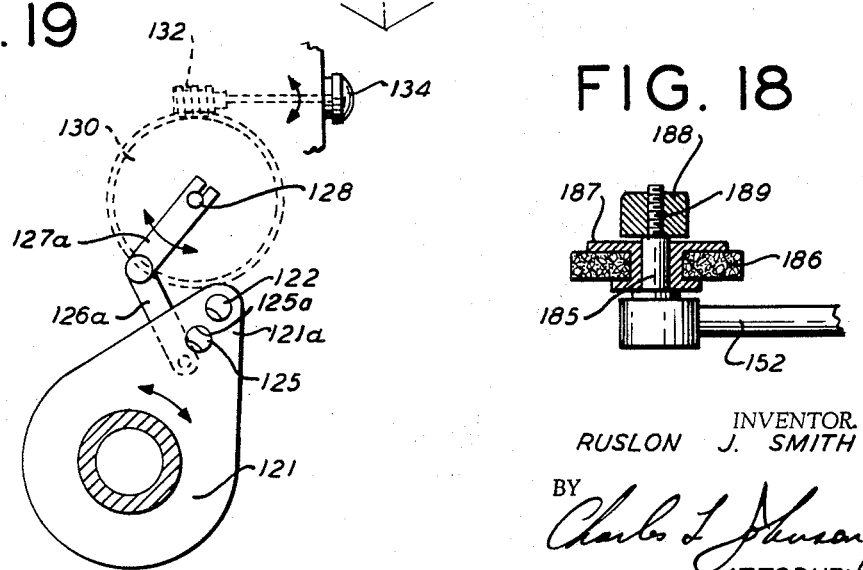
INVENTOR.
RUSLON J. SMITH
BY
Charles L. Johnson Jr.
ATTORNEY

INVENTOR.
RUSLON J. SMITH

United States Patent Office 3,414,452
Patented Dec. 3, 1968

3,414,452
LABELER
Ruslon John Smith, Scranton, Pa., assignor to Eureka-Carlisle Company, a corporation of Delaware
Continuation of application Ser. No. 372,195, June 3, 1964. This application Aug. 22, 1967, Ser. No. 662,547
32 Claims. (Cl. 156—357)

ABSTRACT OF THE DISCLOSURE

Apparatus for disposition proximate an article carrying conveyor including a worm gear adapted to coact with the conveyed articles to properly space same to receive a glued label, or the like, from a vacuum wheel disposed for rotation about a horizontal axis. The vacuum wheel mounts a plurality of nozzles each adapted to receive a label from a stack of labels disposed in a label magazine and to convey same passed a glue dispenser, which drops a spot of hot melt glue thereon, and into engagement with the article to be labeled. A drive motor and vacuum system are disposed beneath the conveyor. Sensing fingers are disposed proximate the worm gear to synchronize label pick-up and a light source and cell cooperate to sense the presence of labeler on the wheel to control release of the glue. The magazine is formed with adjustable side plates and resilient wheels to insure proper label feed.

---

This application is a continuation of Ser. No. 372,195, now abandoned.

This invention relates to an apparatus for use in association with a conventional conveyor for moving cans, jars, containers, packages and the like, the apparatus including means for regulating the feed of the articles carried by the conveyor in synchronized relationship with an assembly for applying labels, folders or the like, the latter including label pick-up means, adhesive applying means and transfer mechanism for the label to a point of application to the article.

One of the main objects of the invention is to provide an apparatus of this type which can be quickly associated with any conventional article conveying mechanism and which will automatically synchronize all of the associated parts regardless of the speed of travel of the articles by the conveying mechanism.

It is also an object of this invention to provide a compact assembly which can be quickly associated with any conventional conveyor feed mechanism and be adjustable with respect thereto for permitting its operation with cans, jars, containers and the like of any dimension.

The present invention more specifically embodies the novel use of a worm drive which is provided with threads so located that the cans, jars or the like will be forced to travel at a predetermined speed and in predetermined relationship without regard to the speed of the conveyor belt by which articles are being delivered, the worm drive being operated in synchronized relationship with the label, folder or the like affixing assembly and controlling the latter in its removal of a label or the like from a suitable source to the point of application.

Another feature of the instant invention is the novel arrangement of means including photoelectric cells which sense the presence or absence of the labels or the like on the vacuum label transfer mechanism and in turn operate an adhesive applying mechanism or wax dropper so that the operation of the latter will occur only when a label is present and further wherein the sensing means is adjustable for positioning of the adhesive or wax at a desired position on the label or the like.

Another important feature of the invention is the provision of novel means for feeding labels, folders or the like from a suitable source, the source being adjustable with relation to the pick-up means and the latter being in the form of regulated vacuum ports through a novel form of manifold block to insure maximum vacuum at the pick-up point.

A further object of the invention is the provision of resilient retaining and feeding wheels rotatably mounted on bearings at each side of the label magazine discharge extremity, the axis of the bearings being generally normal to the direction of the gravity feed of the labels in the magazine, whereby the resilient rubber-like wheels will yieldingly release the labels or the like to the pick-up means and further rotate as the pack travels by gravity after removal of a label or the like into proper position for the next label removal operation.

Another object of the invention is to provide rotatable resilient sponge rubber retaining and feeding wheels at each side of the discharge end of the label magazine, the feed wheels being resiliently mounted for normal movement towards the labels and the like and including manual means for swinging the feed wheels to clear their contact with the labels to facilitate the adjustment of the labels when initially stacked or when a jam occurs at any point in the magazine.

Another feature of the invention is the provision of a microswitch actuated by a jar, can, container or the like as it enters the worm gear for operating the vacuum control means for a preselected port of the vacuum wheel, whereby vacuum is applied to the preselected port for handling of the label, folder or the like and the application of adhesive for the particular can, jar, container or the like which operated the microswitch, whereby the label applicator functions in a selective manner for removal and handling of a label under demand of the individual can, jar or the like, thereby enabling the control and application of preselected labels to preselected containers.

Another object of the invention is to provide a novel switch arrangement for controlling the vacuum to the vacuum wheel, the switch arrangement being preferably of multiple form and being operated by the cans, jars, packages or the like during their regulated feeding by the novel feed screw or worm assembly.

More specifically the invention provides an assembly including a stand having mounted at its base portion a source of power, vacuum tanks and other basic elements essential to the operation of the labeling mechanism positioned at the upper portion of the stand, the labeling mechanism including a feed screw or worm drive, a label feeding mechanism, a label applying mechanism, an adhesive applying mechanism and a control for the various parts for synchronizing and operating same to perform their desired functions. The labeling mechanism is positioned at the upper part of the stand and is so mounted as to overlie a conventional can, jar or container conveyor for operative association therewith.

These and further objects of the invention will more clearly hereinafter appear by reference to the accompanying drawings forming a part of the instant specification, and wherein like characters of reference designate corresponding parts throughout the several views, in which:

FIG. 4 is an end elevation of the entire assembly with the housing panel and magazine removed;

FIG. 5 is a vertical sectional view through the vacuum wheel and adhesive applicator;

FIG. 6 is a perspective view of the screw or worm feed mechanism;

FIG. 7 is a front elevation of the main valve head;

FIG. 8 is a side elevation of the main valve head;

FIG. 9 is a front elevation of the valve plate;

FIG. 10 is a side elevation of the valve plate;

FIG. 11 is a vertical section through the vacuum wheel;

FIG. 12 is a fragmentary front elevation of the vacuum wheel;

FIG. 13 is a side elevation of the mounting shaft;

FIG. 14 is a side elevation partly in section of the magazine;

FIG. 15 is a top plan view of the inner or discharge end of the magazine;

FIG. 16 is a top plan view of the outer end of the magazine;

FIG. 17 is an enlarged perspective showing the label feeding mechanism for the discharge end of the magazine;

FIG. 18 is a sectional view of one of the resilient feed rollers;

FIG. 19 is a front elevation of the linkage mounting the selenium cell assembly;

FIG. 20 is a diagrammatic view showing the arrangement of the applicator and the conveyor;

FIG. 21 is a fragmentary top elevation showing the discharge end of the magazine and its association with a pick-up nozzle;

Figure 2:
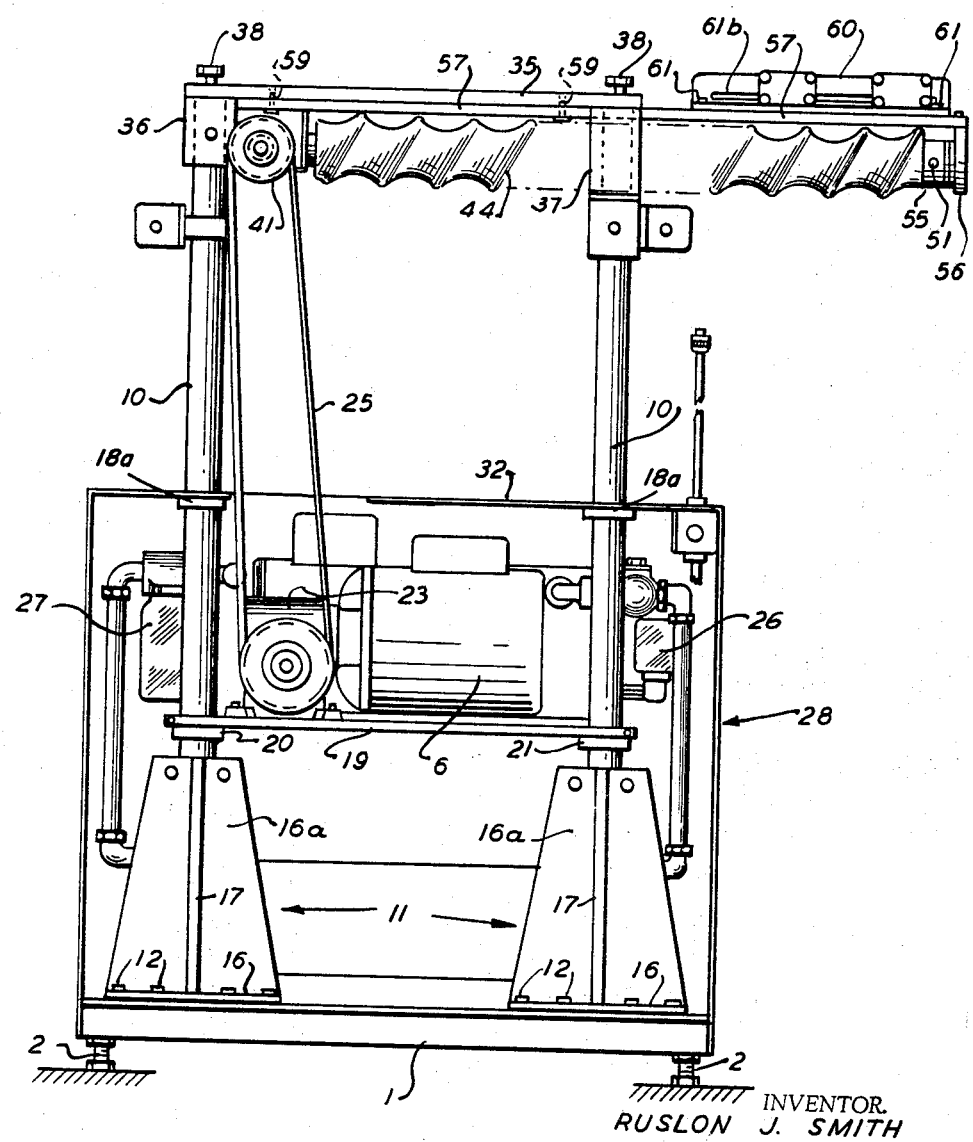
FIG. 2 is a rear elevation of the entire assembly with the rear panel of the bottom housing removed.
Figure 3:
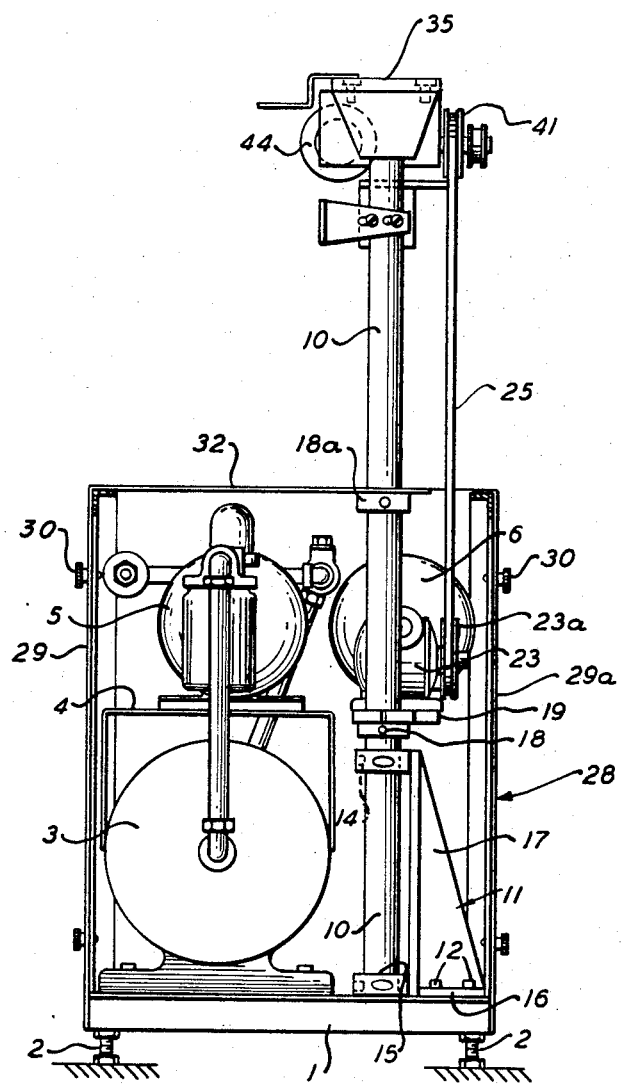
FIG. 3 is a side elevation of the supporting structure with the end housing panel removed.

As best shown in FIGS. 2, 3 and 4, the present assembly includes a base plate 1 supported on adjustable feet 2, these feet having two functions, i.e., a basic adjustment as to height and the leveling of the base plate structure 1. Mounted on base plate structure 1 is a vacuum tank 3 (FIGS. 3 and 4) and on tank 3 is a saddle 4 for supporting a vacuum pump and motor assembly 5. A main drive motor is shown at 6. A diagram showing the connections between the vacuum tank, vacuum pump and motor is clearly shown in FIG. 22.

Disposed to one side of the vacuum tank 3 and vacuum pump assembly 5, is a pair of spaced vertical posts 10 (FIGS. 1, 2 and 3) secured through angular braces 11 (FIGS. 2 and 3) and belts 12 same to base plate 1. Angular braces 11 include and have secured thereto at their top and bottom portions, a pair of collars 14 and 15 which embrace posts 10 to retain posts 10 with their axes normal to base plate 1. Braces 11 each include a horizontal flat base portion 16 through which bolts 12 extend into base plate 1 and a flat vertical upwardly tapered plate 16a to which collars 14 and 15 are attached; tapered plate 16a being positioned adjacent posts 10 with its bottom marginal edge abutting the inner adjacent edge of the base portion 16. A central vertical brace 17 has its bottom overlying base portion 16 and is preferably welded thereto. Central vertical brace 17 is welded to tapered vertical plate 16a medially of its transverse dimension and tapers vertically, upwardly and inwardly to the top of vertical plate 16a. A pair of spaced collars 20 (FIGS. 2 and 3) and 21 (FIG. 2) encircle posts 10 above the supporting braces 11 and are adjustably secured to posts 10 by set screws 18 or other suitable means.

A platform 19 (FIGS. 2 and 3), supported on collars 20 and 21, includes end portions encircling posts 10 and resting upon collars 20 and 21, thereby providing support means upon which electric motor 6 is mounted. Platform 19 also mounts a drive assembly 23 for electric motor 6 so that the motor arrangement can be vertically adjusted to compensate for adjustment with respect to the labeling apparatus with which it is associated and which it directly drives through an endless belt 25, as will be more clearly hereinafter described.

Vacuum tank 3, vacuum pump assembly 5 and drive motor 6, with their associated parts, including a lubricator 27 (FIG. 2) and an air filter 26, are all enclosed in a housing 28 of generally rectangular form A removable front panel 29 (FIG. 3) and back panel 29a are secured to housing 28 by screws 30 so that access can be had to the several enclosed parts for inspection and attention when necessary.

Collars 18a (FIGS. 2 and 3) are secured about posts 10 and a upper panel 32 of housing 28 is supported thereon to complete the structure of the housing assembly. It will be noted that posts 10 are located at each side of the housing assembly and in transverse vertical alignment therewith. Posts 10 extend through top 32 of housing 28 a substantial distance and support thereon an upper platform 35 (FIGS. 1 and 2) having depending sockets 36 and 37 seating on top of posts 10 and adjustably supported thereon by studs 38. Stud 38 extend through platform 35 axially onto posts 10 and upon rotation can adjust the vertical height of platform 35.

Endless belt drive 25 connects a pulley 23a driven by electric motor 6 through the power take-off 23, to a pulley 41 carried by a shaft 41a (FIG. 4) to drive a timing or feed screw 44 (FIGS. 1, 4 and 6), and a vacuum wheel 45 through a belt 47, pulley 48 and shaft 49 all as will be hereinafter explained. Feed screw 44 is illustrated in association with a conveyor belt 42 (FIGS. 1 and 4) traveling across a platform 43 and adapted to transfer packages, cans, jars and similar articles for the application of labels, folders and the like. It is to be understood that the present invention comprehends an apparatus which can be readily associated with a conventional feeding means such as a conveyor and provides an assembly for timing the travel of the cans, jars, packages and the like carried by the conveyor with respect to the labeling assembly including a label applying vacuum wheel, a timing screw and adhesive applying means.

Feed screw 44 (FIGS. 1 and 6) is fixed on a shaft 50 by a set screw 51 and carries at one end thereof a beveled gear 52 in mesh with a gear 53 carried by shaft 41a (FIGS. 4 and 6) and driven by belt 25 from motor 6. Shaft 51 is journaled at one end in a bearing 54 (FIGS. 1 and 6) and at the other end in a bearing 55 carried by a removable depending flange 56 of a supporting plate 57 adjustably clamped beneath and to platform 35 by slots 58 (FIG. 6) and bolts 59 (FIGS. 2 and 6) so that supporting plate 57 and feed screw 44 can be laterally shifted with respect to its support for appropriate adjustment with respect to the cans, jars or packages which are being fed thereby. By mounting feed screw 44 in the manner described, it is vertically adjustable as well as laterally adjustable so that it is capable of functioning with containers of different sizes, heights and diameters.

An angle bracket 60 (FIGS. 1 and 6) is screwed to plate 57 by screws 61, through slots 61a for lateral adjustment and has formed there in a longitudinal slot 61b through which screws 61c mount microswitch assemblies 62 and 63. An actuating arm 64 extends from microswitch assemblies 62 and 63 for engaging fed traveling cans, jars or packages moved by the screw 44 for operation of a vital part of the labeling mechanism which will be hereinafter more fully described.

Mounted on supporting platform 35 is a vertical panel 70 (FIGS. 1, 4 and 5), supporting the vacuum wheel 45 and its associated parts (FIG. 5), with a hub structure 71 including a flange portion 72 secured to panel 70 by suitably spaced bolts 73. Hub structure 71 includes a supporting collar 74 which projects through an opening in panel 70 to strengthen the mounting. A concentric bore 76 formed in hub structure 71 provides a bearing mounting for a shaft assembly 77, the bearings for shaft assembly 77 being indicated by reference character 78. Bearings 78 mount the shaft 77 in bore 76 of hub 71 and are positioned in spaced relation, as clearly shown in FIG. 5.

The details of the shaft assembly 77 are shown in FIGS. 5 and 13, and it will be noted that shaft assembly 77 includes at one end a concentric bore 80, a reduced counterbore 81 and an arcuate slot 82 extending through the wall of the shaft assembly 77 in the area of counterbore 81. The other end of shaft assembly 77 has a reduced portion 83 for mounting a gear 84 (FIG. 5) and a threaded extremity 85 for a lock nut assembly 86. Gear 84 is keyed to reduced portion 83 of shaft 77 (as best shown in FIG. 5) and power is applied to gear 84 by a driven gear 87 fixed to the end of stub shaft 49 through chain drive 47. Arranged in counterbore 81 of the shaft 77 is a cylindrical adjustment plug 88 with a pin 89 projecting laterally therefrom and into a slot 90 in the bore of vacuum wheel 45. Pin 89 is adapted to travel in arcuate slot 82 communicating with counterbore 81. A control knob 91 is fixed to the outer end 92 of an outer cylindrical plug 88a, disposed in bore 80, by a set screw 93. It will be noted that plugs 88 and 88a are fixed in bores 80 and counterbore 81 by pin 89 so that they are free to rotate by actuation of the knob 91 but so that longitudinal movement is arrested by pin 89. From the foregoing it can readily be seen that turning knob 91 to the right or left will move pin 89 laterally back and forth within the confines of spiral slot 82, thereby prescribing an angular displacement of vacuum wheel 45 relative to the axis of shaft 77 within approximately thirty-six degrees.

Vacuum wheel assembly 45 (FIGS. 7 to 11) includes an annular wheel-like structure having a central bore A (FIG. 11) with a projecting hub portion B at its outer side and an annular recess 95 at its opposite inner side. Vacuum wheel 45 is provided with nine radial bores 96 positioned equi-distance about its circumference and in which there are pre-fitted tubular inserts 97 (FIGS. 11 and 12) of steel or other suitable material which project outwardly beyond the circumference thereof and are provided with resilient terminal pads 98 formed with central openings 99 (FIG. 11) aligned with radial bores 100 formed in inserts 97. Resilient pads 98 form vacuum pick-up means or nozzles for vacuum wheel 45 and further provide a cushioned contact element providing desirable flexibility in removing labels, folders and the like from the magazine and applying same to a package or container. Lateral ports 96a connect radial bores 100 of tubular inserts 97 to a valve head assembly 100a (FIG. 5), to be hereinafter described.

Referring now to FIGS. 7 through 10, there is illustrated in detail valve head assembly 100a by means of which suction is applied to the suction ports or nozzles of vacuum wheel 45, with a maximum suction at the point of pick-up of the label, folder or the like, a holding vacuum and an exhaust, all controlled by ports generally in a range approximating an arc of 240 degrees. It will be understood that valve head assembly 100a is mounted on the hub 71, and does not rotate. Valve head assembly 100a (FIG. 5) comprises a cylindrical main valve block or head 101, shown in FIGS. 5, 7 and 8, and a valve plate or disc 102 (FIGS. 5, 9 and 10) carried by main valve head 101 through a pin connection including a pin 103 carried by head 101 and projecting into an opposed socket 104 (FIG. 9) formed in valve plate 102. Valve head 101 (FIG. 7) is formed with a bore 105 having a spline groove 106 for a spline 107 for connection with hub structure 70, as shown in FIG. 5. The face of valve head 101 (FIG. 7) is formed with an arcuate groove or manifold 108 in its outer face and a connection 109 for connecting the source of vacuum with said groove 108. An additional connection 110 connects an inwardly extending port 111 with the source of vacuum, this port 111 being spaced with respect to the groove or manifold 108 for the application of maximum suction to the port 111 for insuring the quick removal of a label, folder or the like from the magazine, as will be more fully hereinafter described. It will be noted that port 111 and its connection 110 are spaced from the adjacent end of the groove 108 an appropriate distance to permit high speed operation of the assembly and association of the port 111 with the arcuate groove 108.

An exhaust port 112 is provided for relieving the vacuum or bleeding the vacuum from the various pick-up nozzles and is positioned a suitable distance from the opposite end of the groove 108 and at a position approximating the point of application of a label, folder or the like to a can, jar, package or similar container, at which point of application the vacuum will be released and the label, folder or the like will be freed from the nozzle.

At the back of the valve head 101 are formed three equally spaced bores 114 for receiving coil springs 115 (FIG. 5) for normally urging valve head 101 toward vacuum wheel 45. Associated with valve head 101 is valve plate 102 having a bore 105a (FIG. 9) similar to bore 105 of valve head 101 for mounting on hub 70 and being adapted to be positioned between valve head 101 and vacuum wheel 45 so that its inner face abuts the adjacent face of valve head 101 and its outer face abuts the adjacent recessed face of vacuum wheel 45 for transmitting vacuum to the various ports 96a of vacuum wheel 45.

Valve plate 102 (FIGS. 9 and 10) is shown with six spaced relatively short arcuate vacuum channels 117, 118, channels 117 being of smaller diameter than end channel 118 which is adapted to function adjacent the pick-up area of the labels or the like from a suitable magazine or hopper, at which point high vacuum is desirable. Channels are used primarily to supply sufficient vacuum to carry or transport the labels or the like, or to give a supply of vacuum to the transport portion of the labeling apparatus from the pick-up area at the magazine to the point of application of the label to a can, jar, package or the like. Valve plate 102, which is of disc form, is fixed to valve head 101 by pin and socket connection 103–104, as previously described, so that it will remain stationary with valve head 101. It will be noted that a relatively large port 119 is provided for large channel 118 and may, as in the present disclosure, approximate ¼" in diameter which will give a high vacuum compared to the remaining five channels 117 which are provided with smaller ports 120, approximating in the present assembly ⅟₃₂" diameters. The relationship of diameters of the ports 119 and 120 is an approximation of the present assembly and adaptation of the invention. A bleed or exhaust port 112a is adapted to communicate with exhaust port 112 in the valve head 101.

The main purpose of the multi-channel valve plate or disc 102, shown in FIGS. 9 and 10, is to maintain as high as possible a vacuum condition at the label pick-up point regardless of the bleeding condition of any nozzles 98 which may be open due to the fact that no label or the like has been picked up by the nozzle from the magazine. Without a label on each nozzle 98 vacuum wheel 45 will bleed vacuum through nozzles 98 into the valve plate channels 117, 118 and through channels 117, 118 into valve 101 to thereby create a drop of vacuum in the system.

As vacuum wheel 45 rotates from the label pick-up position ports 96a thereof travel over valve head 101 in the manifold block area where the vacuum is maintained by only the ⅟₃₂" diameter port 120 which is sufficient to maintain the vacuum throughout the balance of the travel to the point of exhaust of the manifold. Exhaust port 112 is positioned at a point substantially immediately above the can, jar, container or package to which is to be applied the label, folder or the like, as it is at this point that the vacuum must be released by the exhaust port 112 in the manifold block. There is no further vacuum beyond this point until the vacuum ports 119, 120 reach the area opposite the magazine containing the labels, folders or the like and at this point, as described previously, maximum vacuum is applied to the channel 118 through the ¼″ diameter opening port 119. It will be noted that in the vacuum wheel 45 all of the pick-up ports are positioned outwardly and towards front of the machine to permit a maximum area for the positioning and operation of a photocell which actuates the wax dropper mechanism, to be hereinafter described.

Mounted on hub 71 (FIG. 5) and between annular flange 72 thereof hub and the adjacent inner face of valve head 101 is an elongated outwardly tapered plate 121 formed with an annular passageway for its arcuate movement in hub 71. Swinging plate 121 includes a tapered extension 121a upon which is adjustably mounted a photocell 122 by means of an adjustable threaded shank 123 (FIG. 5) and a lock nut 124. Also mounted on plate 121 and extending parallel to the photocell 122 and spaced inwardly therefrom is a light source tube 125 (FIGS. 1, 5, and 19) having a similar threaded adjustment 126 (FIG. 5) and a lock nut 127.

Photocell 122 and the light source 125 are arranged on a line defining an radius of the annular passageway 125a (FIGS. 1, 5 and 19) plate 121, whereby light source 125 projects towards photocell 122 in a position so that light source 125 will be intercepted by any label, folder or the like carried by vacuum wheel 45. The operation of photocell 122 controls the discharge of adhesive for deposit on the label, folder or the like, as will be hereinafter described. Swinging plate 121 is pivotally connected with links 126a (FIGS. 1, 5 and 19) and 127a to a shaft 128 (FIGS. 5 and 19) mounted in a bearing 129 (FIG. 5) journaled in panel 70 and projects therethrough for supporting thereon a gear 130 (FIGS. 1 and 5) fixed to shaft 128 by a set screw 131 (FIG. 5). Gear 130 is operated by a worm 132 (FIGS. 5 and 19) mounted in a bracket 133 (FIG. 5) and controlled by a hand knob 134 (FIG. 19).

By the arrangement shown, photocell 122 and light source 125 can be adjusted arcuately and laterally to insure proper association with the label, folder or the like carried by the vacuum nozzle 97 and for timing the operation of the adhesive dropper in accordance with requirements. By this specific mounting means for photocell 122 and light source 125, the adjustment does not affect the lateral displacement of the controlling parts as the photocell 122 and light source 125 remain concentric, regardless of adjustment, with the axis of the drive shaft on which the hub 71 is mounted and which hub 71 is concentric with vacuum wheel 45 carrying the labels, folders or the like.

Associated with vacuum wheel 45 which transfers the labels or similar data containing material, there is provided a magazine 136 (FIGS. 1 and 14) for containing such labels or other data containing material which is to have deposited thereon drops of adhesive or wax and applied to receptacles, packages, containers and the like. Magazine 136 is best illustrated in FIGS. 14 through 17 and comprises an elongated bottom plate 140 upon which are mounted side plates 141 (FIGS. 15 and 16) and 142, each angularly formed with upright walls extending at right angles from bottom plate 140 and defining the width of magazine 136. Side plate 141, 142 include horizontal flanges are formed with slots 143 adapted to receive fasteners 144 (FIGS. 14 and 15) which extend through bottom plate 140 and when loosened permit side plates 141 and 142 to be moved toward or away from each other to define the selected width of magazine 136. Fasteners 144 may be spring retained or screw or nut type. The identical form of this fastener structure merely provides convenience in adjustment of side plates 141, 142 and permanently holds plates 141, 142 when once adjusted. It will be understood that side plates 141 and 142 of the magazine 136 may be modified to accommodate many forms and sizes of labels, folded material and the like which are to be handled by the assembly.

Magazine 136 is secured by a bracket 145 (FIGS. 1 and 14) panel 70 by screws or other fasteners which extend through arcuate slots 146 (FIG. 14) in bracket 145, whereby magazine 136 can be changed in its angular relation to vacuum wheel 45 to provide maximum efficiency and association of the pick-up arms with the labels or other material in magazine 136.

During the course of normal operation it sometimes becomes necessary for various reasons to adjust the position of the discharge end of the stack of labels and the like in magazine 136 by moving the foremost labels or the like with respect to the ends of the vacuum pick-ups of the vacuum wheel 45. This is accomplished by the use of the vertical fingers 147 (FIGS. 14 and 15) mounted on a cross member 148 (FIG. 14) connected to a rocker arm 149 (FIGS. 14 and 15). Rocker arm 149 is pivoted at 150 medially of its length to bracket 151 mounted on bracket 145. One lateral arm 152 (FIG. 15) of rocker arm 149 is normally urged by an adjustable spring 153 in one direction and a separate oppositely extending arm 154 is adjusted by a screw 155 (FIGS. 14 and 15). The primary function of this mechanism is to provide an accurate adjustment of the position of the stack of labels or the like in the magazine in relationship to the ports of the transfer vacuum wheel 45.

An additional attachment is provided for magazine 136 to insure proper and dependable feeding of the labels or other material to the vacuum wheel 45 by securing and holding the stacked portion in magazine adjacent to its discharge end in a manner to prevent accidental feeding of more than one label, folder or the like but permitting the movement of the stack in the inclined magazine as the labels and the like are separately removed therefrom. This attachment includes a pair of resilient clamping wheels 160, best shown in FIG. 17, which are swingably mounted on arms 161 (FIGS. 15 and 17) at the upper end portions of rotatable posts 162 (FIGS. 14, 15 and 17) by clamp means 164 (FIG. 17). The clamps 164 are vertically adjustable on the posts 162 by screws 165 connecting split arms 166, while arms 161 are adjustably mounted between split jaws 167 clamped together by screws 168. The bottom portions of the posts 162 have adjustably clamped thereto oppositely extending swinging arms 169 and 170, which are clamped to the bottom portions of the posts 162 by screws 171 extending through split jaw portions 172. The ends of arms 169 and 170 are connected together by a link 173, whereby arms 169 and 170 are moved simultaneously in either direction. Normally arms 169 and 170 are held urged together under spring tension by a coil spring 174 connected at 175 to the outer end portion of arm 169 and connected to the outer end portion of a forwardly projecting rod 176 carried by arm 170. By this arrangement resilient feed wheels 160 are normally urged together and into engagement with the outer end or discharge end of the labels, folders or the like carried in the magazine.

To adjust the relative distance between the resilient feed wheels 160 there is provided a thumb screw 180 (FIGS. 15 and 17) having a knurled thumb nut 181, and which extends through a fixed threaded tube 182 having at its inner extremity an enlarged projection, disc or head portion 183 which normally engages inwardly of forwardly projecting arm 176 carried by arm 170. By rotating thumb screw 180 arm 176 can be swung outwardly against the tension of the spring to separate the resilient wheels 160 to adjust their tension against the end portion of the labels or the like at the discharge end of the magazine, as best shown in FIGS. 15 and 21.

In FIG. 18 it will be noted that resilient feed wheels 160 are mounted on upright studs 185 and comprise sponge disc structures 186, preferably of rubber sponge, carried by hub portions 187 and positioned by thumb nuts 188 threaded onto the upper extremity of studs 185 as shown at 189. By reference to FIG. 21 it will be seen that the resilient sponge rubber feed wheels 186 have their axes generally perpendicular to the plane of movement of the labels or the like in the magazine and further that the axes of feed wheels 186, as indicated at 190, are spaced slightly rearward of the outer label, folder or the like at the discharge end of the magazine. The positions of the axes of wheels 186 and their arrangement with respect to the outer layer of the stack of labels or the like will facilitate the tendency of slight rotation by the resilient feed wheels 186 due to the weight and travel of the stack of labels or the like when the end label is removed by the vacuum wheel. Thus, not only is there a controlled delivery of the end label to the vacuum wheel, but the stack of labels, while firmly held and positioned, is constantly fed forward towards the pick-up station.

It will also be noted from an inspection of FIG. 21 that the sponge rubber surfaces 186 of the feed wheels 160 are slightly depressed at their points of engagement with the labels or the like providing suitable friction as determined by the adjustment of spring 174 and thumb screw 180. The adjustment of thumb screw 180 may be varied in accordance with the nature of the label, folder or the like being discharged from magazine 136 by vacuum wheel 45. It will be noted that arms 161 which carry resilient feed wheels 160 are adjustable lengthwise of magazine 136, as well as vertically due to the novel mounting of the wheels on posts 162. It will also be noted that bottom clamps or arms 169 and 170 are likewise adjustable which will facilitate the proper operation of the connecting link 173 and insure free movement of the mounting parts.

By the structure heretofore described, and the use of the universal clamps at the upper and lower ends of the posts 162, quick rough adjustment of resilient wheels 186 can readily be obtained while the finer and more accurate adjustments can be obtained by adjustment of thumb screw 180.

It is to be understood that fingers 147 which are adjusted by screw 155 function to obtain a minimum gap between the discharge end of the labels in the magazine with respect to the pick-up nozzles of the vacuum wheel. It will be obvious that rod 161 which is used for fine adjustment by screw 180 can be easily manually operated to separate feed wheels 160 to permit the proper feeding of the labels or the like in the magazine when the magazine is being initially filled. A manual operation of this rod 161 might also be used should occasion arise, due to a jam which might occur at the discharge end of the magazine. The handle being normally spring loaded, when released, the wheels will return to their appropriate and proper operating position.

It is intended that the preferred adhesive be in the form of a hot liquid wax or the like and is to be dispensed in synchronized association with the labels advanced by the vacuum wheel 45 so that a drop of the hot liquid wax will be available and applied to each label or the like as it is presented to a position immediately below the wax dropper. The wax dropper or dispenser 198 disclosed in FIG. 5 forms a part of a separate application Ser. No. 268,363 now Patent 3,200,860. However, in order that the operation of the instant combined assembly and its function be fully understood, this adhesive dispenser or wax dropper 198 is generally described herein.

Wax dropper assembly 198 is mounted against panel 70 by screws, one of which is shown at 200 (FIG. 5), which are movable in slots 201 in panel 70 and thereby permit adjustment of wax dropper assembly 198 in a vertical plane facilitating a height variation between the vacuum wheel assembly 45 and a nozzle 202. A melting pot 203 which may be made in the form of an aluminum casting providing a wax or adhesive container is retained in a housing 204 and insulation 205 is provided between melting pot 203 and housing 204. Pot 203 is provided with a discharge nozzle 202 having a vertical port 206 therein and adjusting screws 207 support melting pot 203 and nozzle 202 and thereby permit their adjustment vertically so that the relationship of discharge port 206 may be properly associated with a label M being presented by vacuum wheel 45 immediately therebeneath.

Within pot 203 there is provided an inverted perforated basket 208 for supporting unmelted wax or adhesive 208a, thus permitting only melted wax or adhesive to be contained in the lower or discharge portion of the pot 203. A cylindrical filter screen 209 is vertically arranged about the vertical medial portion of pot 203 and is generally axially aligned with the discharge nozzle 202. A vertical rod or drive shaft 210 carries at its lower end a needle valve 211 for opening and closing discharge port 206 in nozzle 202 to permit a drop of adhesive or wax to be dispensed and to fall by gravity onto the label or the like indicated at M. Rod or drive shaft 210 operating needle valve 211 is axially aligned with discharge port 206 and is coupled at 212 with a rotary solenoid positioned in a housing 214 supported in a clamp ring 215 by supports 216 on a supporting plate 217 mounted on top of pot 203. Solenoid housing 214 is formed with external threads 218 which are threaded within clamping ring 215, whereby housing 214 and rotary solenoid contained therein may be vertically adjustable within clamping ring 215 to insure operation of needle valve 211 by the rotary solenoid in accordance with requirements.

Figure 22:
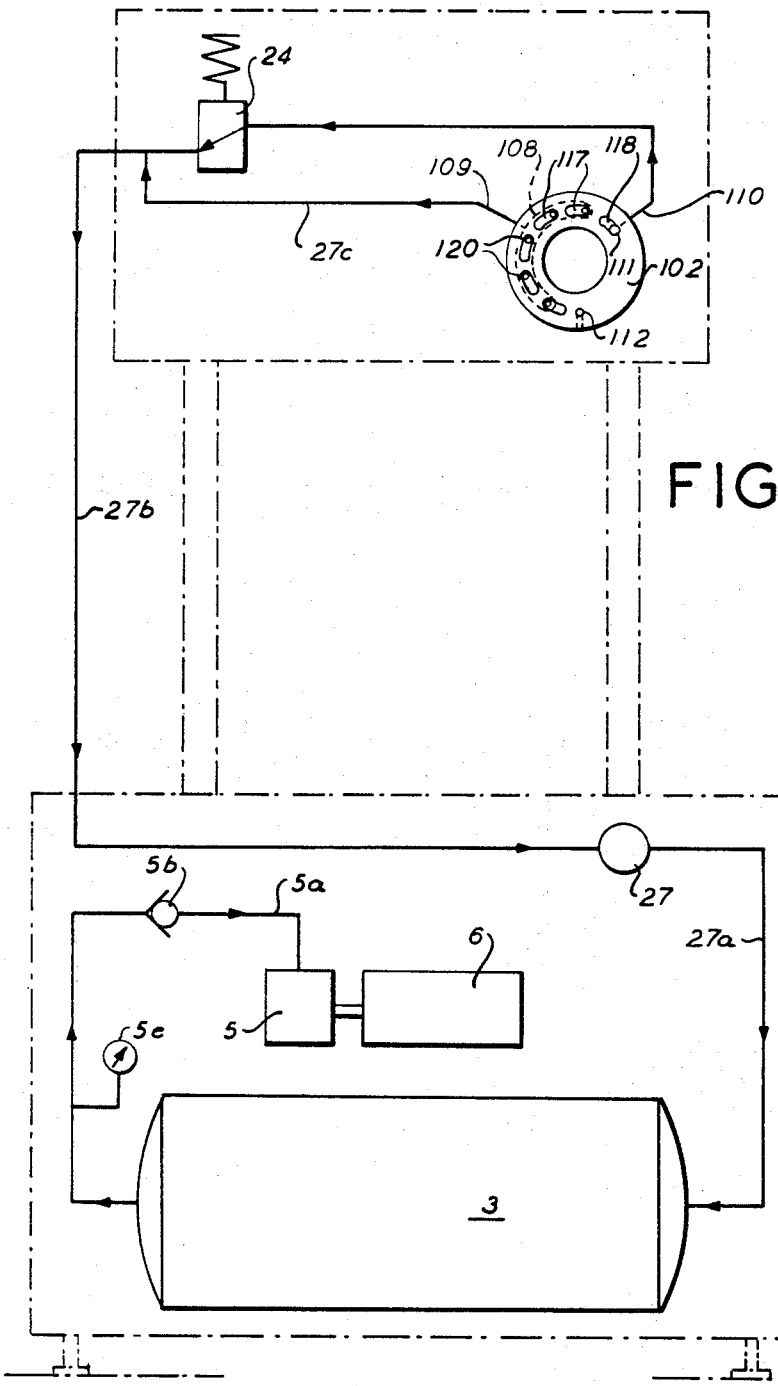
FIG. 22 is a diagrammatic view of the vacuum system.

Referring to FIG. 22 which is a diagrammatic view of the vacuum supply and control system, vacuum tank 3 is shown connected with vacuum pump 5, driven by motor 6, through a conduit 5a and a check valve 5b with a vacuum gauge 5c disposed in the line. Vacuum is supplied from vacuum tank 3 through a conduit 27a, a filter 27, a conduit 27b, and solenoid valve 24 operated by one or both of the microswitches 62 and 63 to the port 111 for application of maximum controlled suction at the point of pick-up of a label, folder or the like. A conduit 27c bypasses the solenoid valve 24 and is connected to arcuate groove or manifold 108 through connection 109, conduit 27c being normally open and normally applying a holding vacuum to the other various ports in plate 102 as the vacuum wheel 45 rotates counterclockwise thereagainst.

Figure 1:
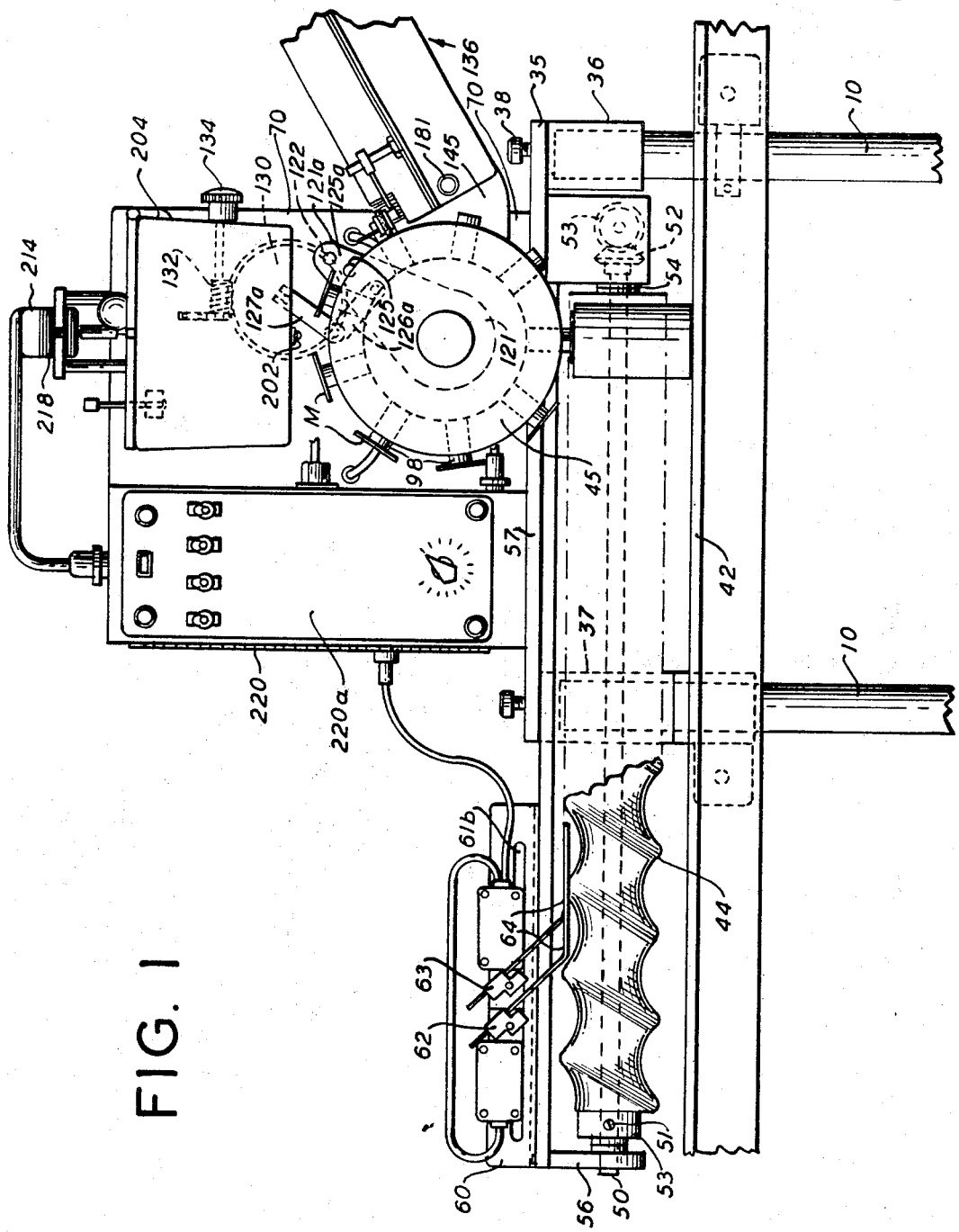
FIG. 1 is a front elevation of the upper portion of the stand showing the worm drive, label feeding and applying mechanism, the adhesive applying assembly and the control mechanism, all mounted on a supporting panel.
Figure 23:
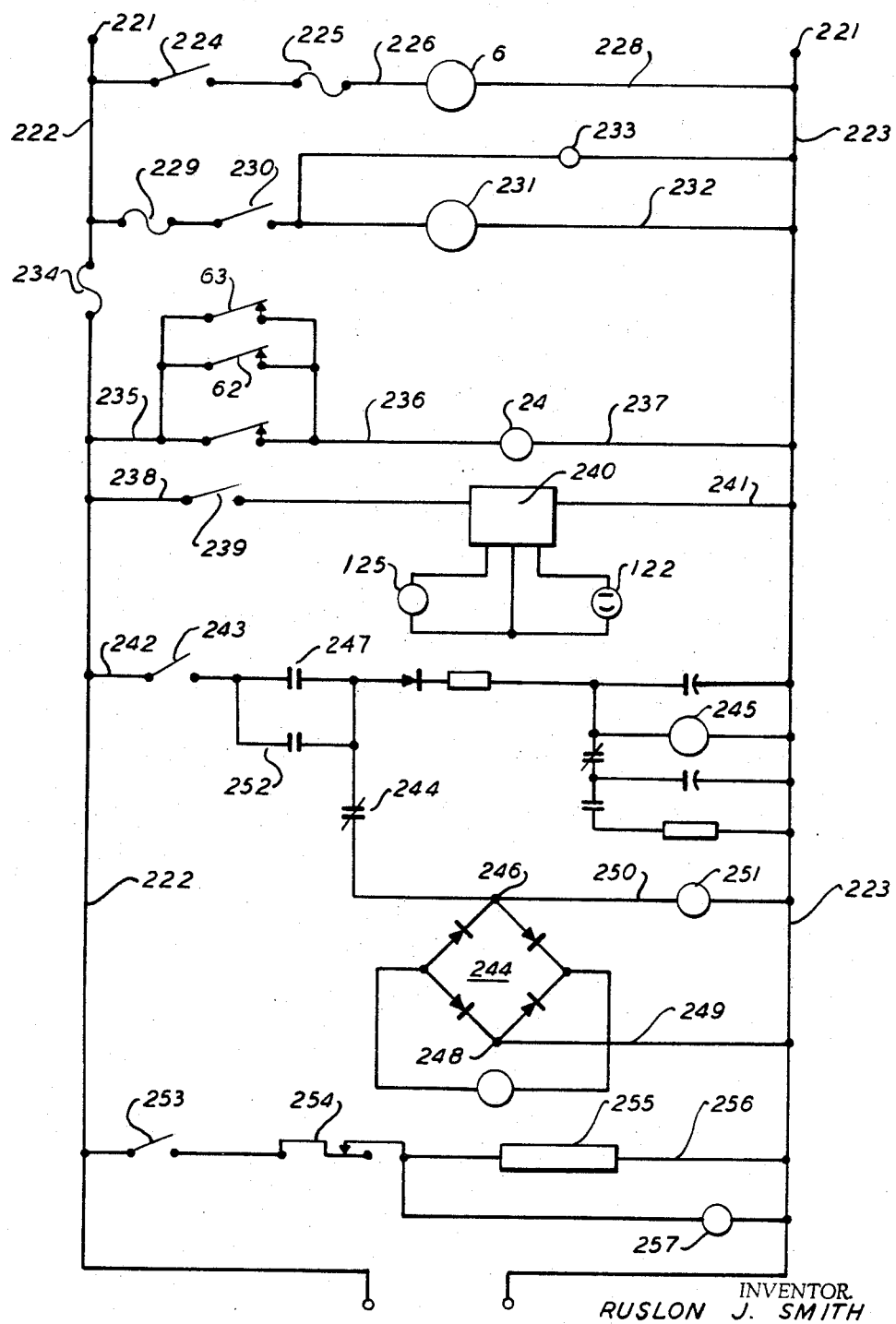
FIG. 23 is a diagrammatic view of the wiring system.

In FIG. 23 a diagrammatic view of the wiring system is disclosed providing the operation and functioning of the various parts of the labeling machine, it being understood that the major portion of the electrical control is contained in a housing 220, which is shown in FIG. 1, including a control panel 220a. The circuit may be a 110 A.C. supply at terminals 221 connected with the input conductors 222 and 223.

The first circuit which operates the vacuum pump 5, follows conductor 222 through switch 224, fuse 225, line 226, drive motor 6, line 228 to the conductor 223. A second circuit is through conductor 222, fuse 229, switch 230, vacuum pump motor 231, line 232 to conductor 223. A pilot lamp is shown in this circuit at 233. The third circuit includes conductor 222, fuse 234, line 235, normally closed microswitches 62 and 63, line 236, solenoid 24, line 237 to conductor 223.

The photocell circuit is through conductor 222, line 238, heat toggle switch 239, photocell 122, light source 125, amplifier 240 and line 241 to conductor 223. The next circuit relates to the adhesive dropper control and particularly to its valving means. This circuit includes conductor 222, line 242, microswitch 243, the normally closed contacts 244 of the time delay relay 245, the terminal post 246 of the A.C. input of the rectifier 247, the terminal post 248 of the A.C. return, the conductor 249 to conductor 223. A further connection is made by the post 246, conductor 250, holding relay 251 to conductor 223.

It will be noted that a parallel circuit exists between the conductor 222 and the conductor 250 by the presence of the relay 251 and contacts 252. A further branch of this time delay circuit is in conductor 222.

The circuit to the wax heater element is as follows: from the conductor 222, through switch 253, thermostat 254, heating element 255 and line 256 to conductor 223. A pilot lamp is shown at 257.

The operation of the assembly and its function include several novel structures. In the first place, the feeding of the containers or the like is from a conventional conveyor belt indicated in the several views by reference character 42. The conveyor belt 42 is generally the conventional belt used by a customer in connection with the filling and closing apparatus for the containers, jars, cans or the like. The present assembly is so constructed, as heretofore pointed out, that it can be moved into position with the vacuum apparatus and the power source in a base under the conveyor belt and with the synchronizing mechanism for the containers and the like and the labeling apparatus generally overlying the conveyor. The feeding and synchronizing apparatus for the jars, cans and the like includes the worm or screw 44 which is mounted on a supporting plate 57 and through the bolts and slots 58–59 is adjustable with respect to the assembly for movement towards the conveyor so that the worm or screw 44 will properly associate itself with the container or the like, regardless of its size or shape, as shown generally in FIG. 6.

The worm or screw 44 is preferably made from plastic material which has been machined in such a manner as to give a screw effect and the difference between the screw shoulders equals the distance required for the jar, can or the like. Generally, the distance between the shoulders of the screw structure will accommodate several sizes of jars, cans or the like. However, in some instances it may be necessary because of the size of the container to substitute a screw or worm of different configuration and this is readily done by removing the end plate 56 of the assembly shown in FIG. 6, withdrawing the shaft 50, removing the screw or worm from the shaft and substituting a new screw or worm therefor.

Inasmuch as there is a tendency of the screw to urge a jar, can or other container transverse to the direction of movement of the conveyor carrying the container, a spring loaded back-up bar, such as indicated at N, is preferably used to prevent lateral dislodgment of the articles carried by the conveyor. When a jar, can or other container carried by the conveyor enters the screw, the container depresses the microswitch or switches 62–63 which causes the solenoid valve 24 controlling the vacuum to be actuated. The microswitches 62–63 are normally closed and are moved to open position to operate the valve by the traveling jars, cans or the like on the conveyor. Where a plurality of containers or a continuous array of jars, cans and the like are being moved by the screw 44, the microswitch remains depressed and the solenoid 24 remains open. As soon as there is an absence in the container sequence being moved by the screw, the microswitch opens and the solenoid valve is closed. By this arrangement once a container, such as a can, jar or the like, enters the screw it is automatically synchronized with the label, folder or the like on the particular vacuum wheel port that was activated when the container entered the screw. By the time the container arrives beneath the vacuum wheel port carrying the particular label, folder or the like, the label will have been traveled by the vacuum wheel to the application position for the particular container.

The deposit of the wax by the wax dropper is controlled by the presence of a label, folder or the like on a vacuum wheel port by the instrumentality of the photocell 122 due to the fact that the label, folder or the like intercepts the source of light 125 to the photocell as they are carried about the vacuum wheel 45. In this connection and by reference to FIGS. 5 and 19, it will be seen that the selenium cell and the light source are mounted for adjustment so that the wax dropper can be accurately and quickly synchronized to perform its wax dropping operation. By having the wax dropper operate to perform its function of applying a drop of wax on the labels, folders and the like, controlled by the labels being traveled by the vacuum wheel, it will be obvious that there can be no miscarriage insofar as the wax dropper is concerned, i.e. wax will only be deposited when there is a label, folder or the like in position on one of the pick-up means 98 of the vacuum wheel 45. The relative position of the label, folder or the like carried by the pick-up means of the vacuum wheel is more clearly shown in FIGS. 1 and 5.

Another important departure from the prior art is the provision of the sponge rubber feed wheels 160 which are adjustable in every respect, i.e. vertically and longitudinally due to their novel mounting. Also, the feed wheels 160 while normally urged together for gripping the labels, folders or the like carried at the discharge end of the magazine are associated with a manual adjustment in the form of the thumb screw 180 which can be moved to resist the normal urge of the spring 174 to cause a fine adjustment of the feed wheels 160, it being noted that while the thumb screw 180 only operates a single feed wheel, these wheels are linked together so that movement of one is followed by a corresponding movement of the other.

By referring to FIG. 21 it will be seen that the vertical axes 190 of the feed wheel mountings are spaced rearward of the outermost label or the like at the discharge end of the magazine and that these feed wheels, due to their soft resilient surface structure, hold the labels, folders and the like against accidental displacement but leave them free for removal by the vacuum pick-up means of the vacuum wheel.

The magazine holding the labels, folders or the like is originally adjusted angularly to provide a normal feed by gravity in the direction of the vacuum wheel and the position and arrangement of the feed wheels at the end of the magazine and the ability of these feed wheels to rotate freely permit the stack of labels, folders and the like to move forward into position for removal by the vacuum wheel. It will be understood that the same magazine is capable of adjustment laterally to provide for different widths of labels, folders and the like and the difference in weight of material in the magazine which tends to cause movement towards the vacuum wheel can be modified to obtain maximum results by angular adjustment of the magazine. It may be stated that the angle at which the magazine is set with respect to the vacuum wheel would be with the least pitch that would permit the labels, folders and the like to slide down the magazine in an ordinary manner without exerting any more pressure at the discharge end than is necessary.

The present invention is illustrated with a vacuum wheel and a worm and screw feed particularly designed for nine ports, however, the same inventive concept can be utilized in feeding and labeling with any number of ports and particularly with ports in the multiple of three.

I claim:

1. An apparatus for applying labels, folders and the like to articles carried by a conveyor, which is separate from said apparatus; comprising:
   (a) a base portion adapted to be positioned beneath a conveyor and mounting a source of suction including a vacuum pump and a motor;
   (b) support means supporting said vacuum pump and motor on said base for vertical adjustment;
   (c) a pair of supporting posts carried by said base at one side thereof and extending above said vacuum pump and motor at one side of the conveyor;
   (d) a platform carried by said posts above said vacuum pump and motor and overlying same;
   (e) platform adjusting means for adjusting said platform vertically on said posts;
   (f) a label feeding and applying mechanism supported on said platform and adapted to overlay the conveyor;

(g) said label feeding and applying mechanism including a rotatable vacuum wheel having a plurality of radially extending vacuum pick-up members;

(h) vacuum means coacting with said vacuum wheel;

(i) said label feeding and applying mechanism further including magazine means having a discharge end adjacent the path of movement of said pick-up members;

(j) article feed means carried by said platform and adapted to engage and regulate the movement of articles carried by the conveyor and to synchronize their movement with the operation of said label feed and applying mechanism;

(k) adhesive means for applying an adhesive to labels carried by said pick-up members;

(l) a selenium cell;

(m) a source of light for operating said cell so positioned that the light from said source will be intercepted by labels carried by said pick-up means;

(n) control means for controlling the operation of said adhesive means from said selenium cell;

(o) switch means controlled by the movement of articles by said article feed means for controlling the vacuum to said pick-up members of said label feeding and applying mechanism; and (p) drive means coacting with said label feeding and applying mechanism and said article feed means to operate same.

2. The apparatus of claim 1 wherein said drive means is provided between said motor and said article feed means and between said article feed means and said rotatable vacuum wheel.

3. The apparatus of claim 1 wherein:
(a) said article feed means includes an elongated screw adapted to be arranged adjacent to the conveyor;
(b) said elongated screw being removable as well as mounted for vertical and lateral adjustment.

4. The apparatus of claim 1 wherein said article feed means includes a screw member rotatably mounted on a shaft supported between a pair of spaced bearings suspended from a horizontal support adjustably secured to said platform.

5. The apparatus of claim 4 wherein said horizontal support is adjustably secured to said platform by bolt means extending through elongated slots formed in the horizontal support and in said platform.

6. The apparatus of claim 1 wherein:
(a) said magazine means is provided at each side of its discharge end with rollers;
(b) said rollers having resilient outer contact surfaces adapted to engage labels at their point of discharge from said magazine means, and which are movable away therefrom.

7. The apparatus of claim 5 wherein said rollers are rotatably mounted on bearings having their axis rearward of the outermost label in said magazine means.

8. The apparatus of claim 1 wherein:
(a) said selenium cell and said source of light are disposed for movement about the axis of rotation of said vacuum wheel; and
(b) light and cell adjustment means are provided to adjust the disposition of said selenium cell and said source of light about said vacuum wheel so that said adhesive means applies the adhesive to the labels after the labels intercept the light between said source of light and said selenium cell.

9. The apparatus of claim 1 wherein:
(a) a microswitch is adjustably mounted on said platform;
(b) said microswitch extends into the path of movement of articles as they are fed by said article feed means, and coacts with said vacuum means to selectively control same and thereby the operation of said pick-up members.

10. An apparatus for applying labels, folders and the like to articles comprising:
(a) a supporting structure;
(b) a rotatable vacuum wheel having a plurality of radially extending vacuum pick-up members mounted on said supporting structure;
(c) drive means for driving said rotatable vacuum wheel;
(d) a source of vacuum means;
(e) means for delivering and controlling the vacuum to said pick-up members;
(f) label feeding means including a magazine having a discharge end adjacent the path of movement of said pick-up members;
(g) said magazine including a channelway for holding labels, folders and the like, and rollers controlling the discharge of labels from said channelway;
(h) said rollers having resilient surfaces;
(i) spring means for urging said rollers into engagement with labels at each side of the discharge end of the passageway; and
(j) manually actuated means for adjusting said rollers against the tension of said spring means for varying the resistance of said resilient surfaces of said rollers to labels at their point of discharge.

11. The apparatus of claim 10 wherein:
(a) said rollers are mounted on bearings at the end portions of swinging arms;
(b) said arms are mounted on vertical posts each having projections linked together to provide for simultaneous movement of said rollers;
(c) one of said connected posts including a projection engaging an abutment at the end of a threaded member mounted in a fixed threaded nut, whereby movement of said threaded member will limit the inward movement of said rollers under tension of said spring means.

12. A magazine for feeding labels, folders and other sheet material; comprising:
(a) a body of channel form for receiving a stack of labels or the like having an inlet end and a discharge end;
(b) retaining means for retaining a stack of labels and the like in said channel including rotatable wheels having resilient peripheries mounted at each side of discharge end of said channel; and
(c) biasing means for urging said rotatable wheels towards the lateral edges of labels and the like to engage same and permit removal of individual labels or the like and movement of the stack of labels towards said discharge end after removal of any of the labels.

13. The magazine of claim 12 wherein said rotatable wheels lie in a plane generally normal to side walls of said body on bearings having their axis slightly spaced inwardly of the end of the stack of labels.

14. The magazine of claim 12 wherein:
(a) said rotatable wheels have resilient peripheries, are mounted at each side of said discharge end of said body, and are linked together by linking means to permit their simultaneous inward and outward movement; and
(b) said biasing means comprises spring means connected with said linkage means.

15. The magazine of claim 12 wherein:
(a) additional stop means are provided for the stack of labels and the like at said discharge end of said body;
(b) said stop means including a pair of spaced posts extending vertically in front of the stack and forming an abutment for the latter; and
(c) abutment adjustment means coacting with said abutment and including linkage connected to a yoke pivotally mounted on a frame, spring pressed at one end, and adjusted by a screw means at the other end.

16. The magazine of claim 12 wherein said rotatable wheels have their peripheral portions formed of sponge rubber.

17. The magazine of claim 12 wherein said body is mounted on a bracket provided with arcuate slots to permit same to be adjusted angularly.

18. An apparatus for transporting labels, folders and the like from a magazine adapted to house a plurality thereof to a place where they can be associated with an article comprising:
   (a) a supporting structure;
   (b) a hub member mounted on and fixed to said supporting structure;
   (c) a driven shaft extending through said hub member and mounted in bearings positioned in said hub member;
   (d) a rotatable vacuum wheel having a plurality of radially extending vacuum pick-up members mounted on said driven shaft outwardly of said hub member;
   (e) vacuum wheel adjusting means for adjusting said vacuum wheel about said shaft;
   (f) a source of vacuum;
   (g) connecting means for connecting and controlling the vacuum from said source through said vacuum wheel and to said vacuum pick-up members including a manifold block splined on said hub member and normally spring urged towards said vacuum wheel, and a valve plate connected to the outer end of said manifold block and positioned between the outer face thereof and said vacuum wheel to provide passageways from said manifold block to said radially extending vacuum pick-up members;
   (h) said manifold block having its outer face formed with an arcuate channelway connected to source of vacuum;
   (i) said valve plate including a multiplicity of arcuate grooves and passages connected with said arcuate channelway, and with ports formed in said vacuum wheel and communicating with said vacuum pick-up members;
   (j) said arcuate passages in said valve plate being less than the number of vacuum pick-up members carried by said vacuum wheel;
   (k) and an exhaust port formed through said valve plate and communicating with an exhaust port in said manifold block for releasing the vacuum to said vacuum pick-up members.

19. The apparatus of claim 18 wherein:
   (a) said source of vacuum includes a motor and a vacuum pump which are mounted on said supporting structure and
   (b) drive means between said motor and said vacuum pump, and said motor and said driven shaft upon which said vacuum wheel is mounted.

20. The apparatus of claim 18 wherein said manifold block and said valve plate are linked together by a pin member seating in opposed recesses formed in adjacent faces of said manifold block and said valve plate.

21. The apparatus of claim 18 wherein means are provided for controlling and regulating the amount of vacuum available from said source of vacuum to said pick-up members carried by said vacuum wheel.

22. The apparatus of claim 18 wherein said manifold block and valve plate coact with said vacuum wheel to supply maximum vacuum to said pick-up members when said pick-up members are picking up a label and reduce amount of vacuum to said pick-up member after label has been so picked up.

23. An apparatus for applying labels, folders and the like to articles carried by a conveyor which is separate from said apparatus; comprising:
   (a) a platform adapted for disposition in proximity to the conveyor;
   (b) a label feeding and applying mechanism carried by said platform so as to overlay the conveyor;
   (c) said label feeding and applying mechanism including a label storage magazine and a rotatable vacuum wheel having a plurality of radially extending vacuum operated label pick-up members each of which is adapted to remove a label from said label storage magazine and transport same along a predetermined path;
   (d) article feed means carried by said platform for coaction with, and for regulation of the movement of, articles when carried by the conveyor, to move the articles in proximity to said predetermined path in synchronization with the movement of said label feeding and applying mechanism so that the article so moved will be in position to receive a label therefrom;
   (e) drive means for driving said label feeding and applying mechanism and said article feed means;
   (f) vacuum means for supplying vacuum to said rotatable vacuum wheel; and
   (g) control means for controlling the operation of said vacuum means.

24. The apparatus of claim 24 wherein:
   (a) said rotatable vacuum wheel includes valving means providing vacuum of a first magnitude to each of said label pick-up members when in position to pick-up a label from said magazine and for providing vacuum of a second magnitude which is less than that of said first magnitude to each of said label pick-up members after they pass the position wherein they pick up a label and until they arrive at a position to deposit the label upon an article; and
   (b) said control means including article responsive means responsive to the presence and absence of articles to control the application of said vacuum of said first magnitude to said valve means so as to prevent the pick up of a label thereby when there is no article to be labeled.

25. The apparatus of claim 24 wherein:
   (a) said article responsive means includes a pair of article responsive elements disposed for coaction with the articles to be labeled and are mounted so that each article to be labeled coacts first with one, then with both, and then with the others; and
   (b) said control means further includes selenoid means responsive to concurrent actuation of both of said article responsive elements to control the application of said vacuum of said first magnitude to said valve means.

26. The apparatus of claim 25 wherein said article responsive elements adjustably disposed for movement with respect to each other and for movement as a pair to accommodate articles of different sizes.

27. The apparatus of claim 25 wherein said article responsive elements comprise microswitches having actuating arms disposed for coaction with the articles to be labeled.

28. The apparatus of claim 23 including:
   (a) adhesive means for applying adhesive to labels carried by said label pick-up members as the labels are transported along said predetermined path; and
   (b) adhesive control means responsive to the presence and absence of labels on said label pick-up members and coacting with said adhesive means to control the application of adhesive to the labels.

29. The apparatus of claim 28 wherein said adhesive control means includes a photo responsive element and a source of light directed thereagainst disposed in position to be intercepted by a portion of a label when being transported by a label pick-up member to said adhesive means.

30. The apparatus of claim 29 wherein said photo responsive element and source of light are disposed for adjustable positioning such that the operation of said adhesive means may be selectively controlled.

31. The apparatus of claim 23 wherein said article feed means includes an elongated screw arranged adjacent the conveyor.

32. The apparatus of claim 31 wherein said elongated screw extends from a position wherein said pick-up members deposit the label upon the article to a position removed therefrom a sufficient distance to accomplish the synchronizing of the operation.

No references cited.

EARL M. BERGERT, *Primary Examiner.*

M. L. KATZ, *Assistant Examiner.*